United States Patent Office 3,450,177
Patented June 17, 1969

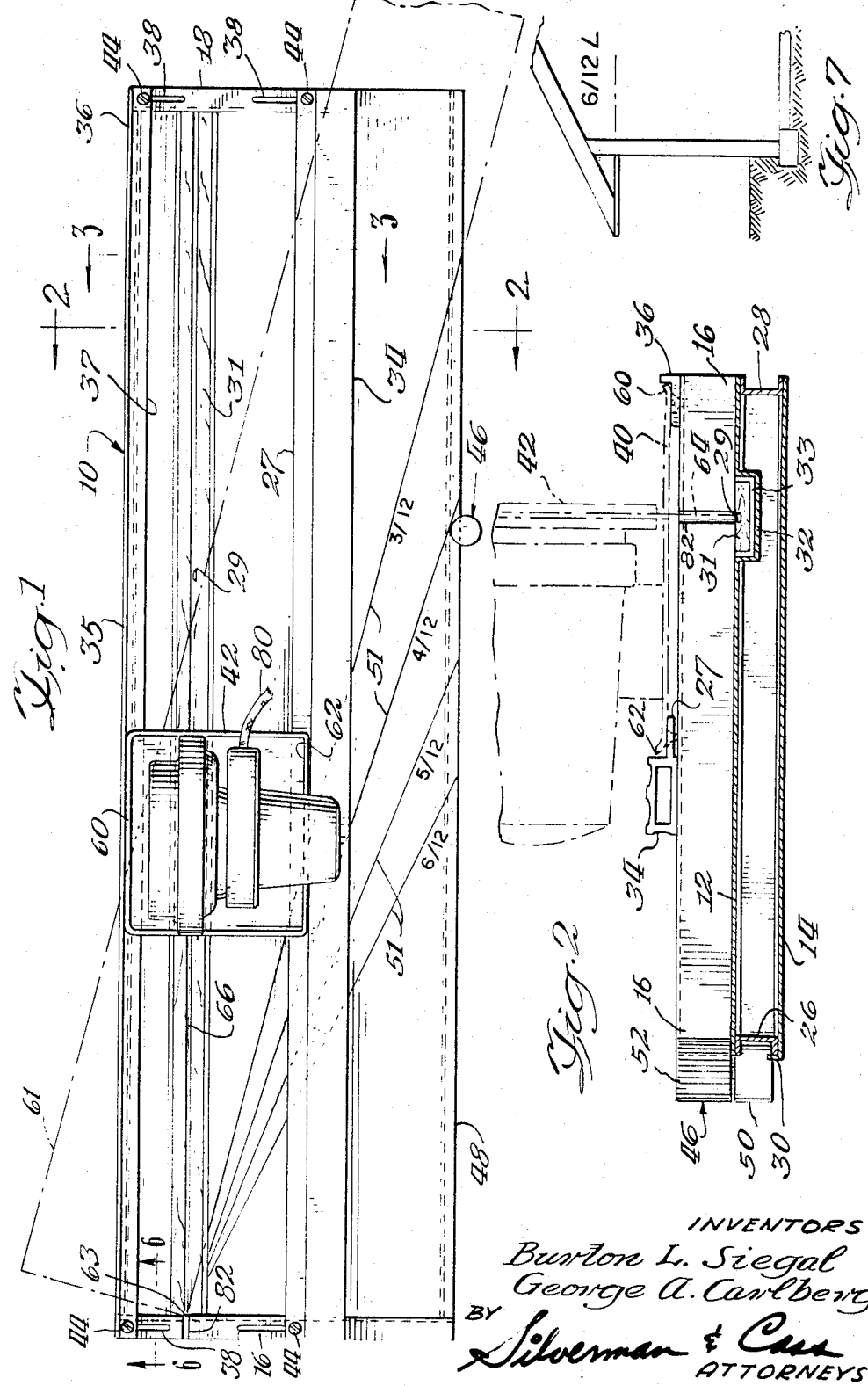

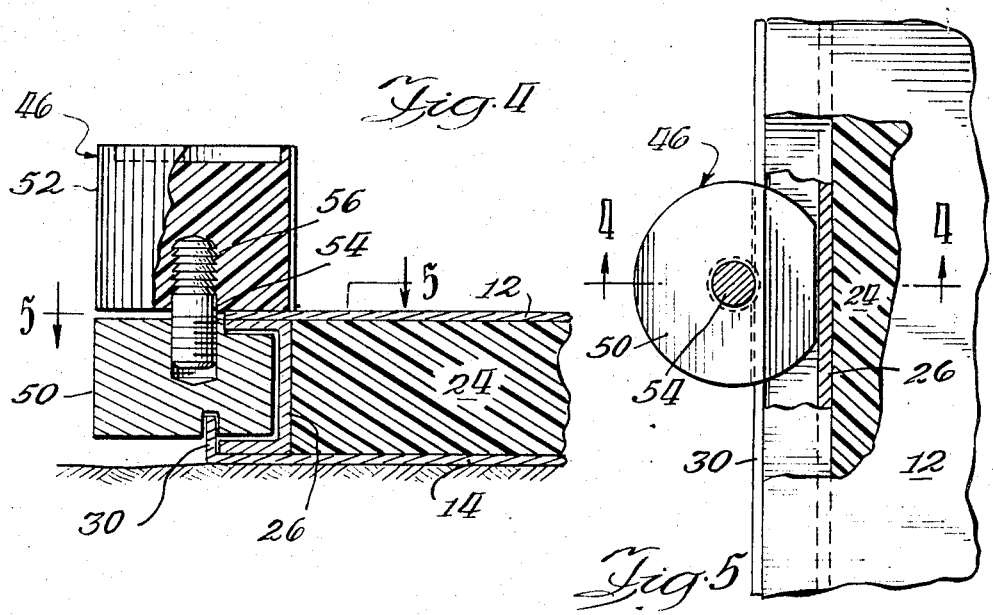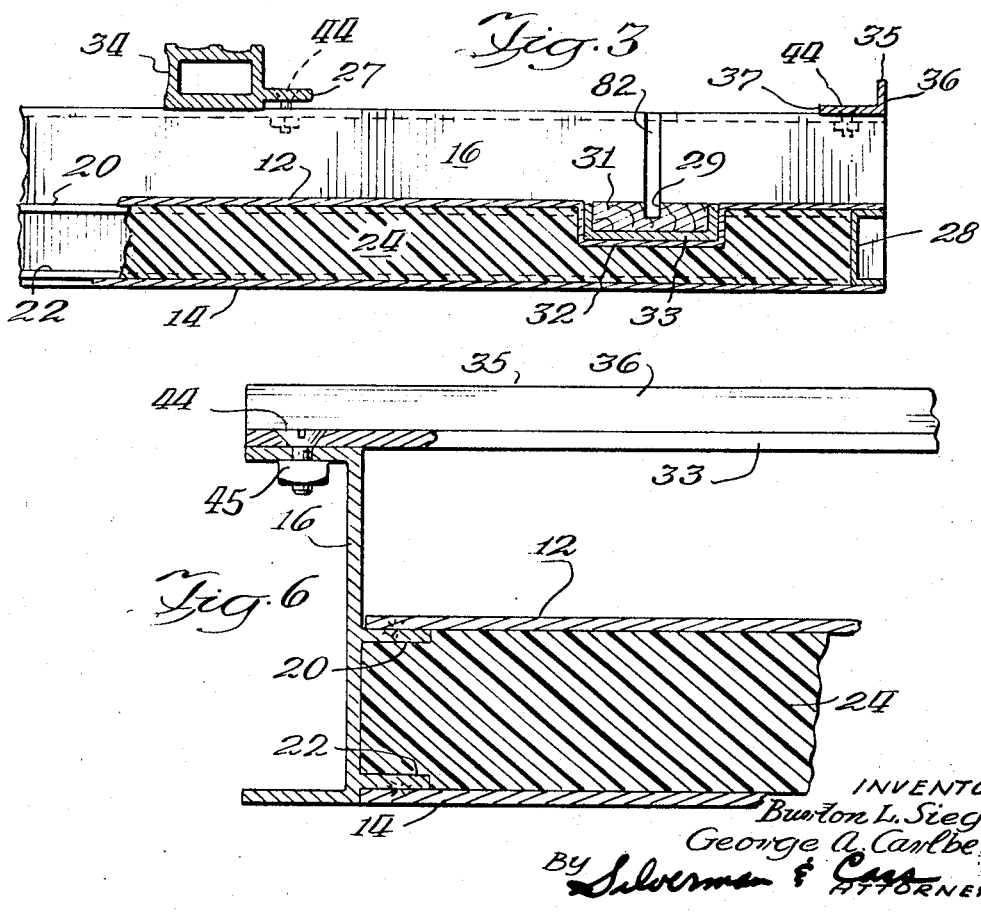

3,450,177
PORTABLE SAW TABLE
Burton L. Siegal, Skokie, and George A. Carlberg, Northbrook, Ill., assignors to Porta-Table Corporation, Chicago, Ill., a corporation of Illinois
Filed Oct. 3, 1966, Ser. No. 583,845
Int. Cl. B27b 27/06, 5/18, 27/08
U.S. Cl. 143—6                                    5 Claims

ABSTRACT OF THE DISCLOSURE

A portable saw table for use in cutting construction materials with a portable saw positioned upon guide rails above the table. The saw table has a bed constructed of two plates, the uppermost plate having a recess within which the blade of the portable saw is received when said saw is positioned upon the table. As top guage is movably positioned along one elongate edge of the table to serve as a guide member for positioning the construction material upon the table at the proper angle to be cut.

---

This invention relates generally to tables for use in conjunction with portable power saws, and more particularly, to a portable saw table of the character described which will enable selective cuts to be made at any one of a plurality of prescribed angles.

Portable power saws are in wide use today in the construction field by both the professional carpenter and the average homeowner. In both areas of use, such saws have proven to be a convenient and effective means for sizing and mitering construction materials. It is necessary, however, in the use of such saws, that an adequate support for the construction material, as well as guide means for the saw, be available. Carpenters, for example, measure studding and sheeting as necessary at the job site and mark the desired length or angle on the material to be cut. A portable electric saw is then manually manipulated to cut the material. The carpenter must improvise his support and guide means such as by setting up wooden horses under the work material and using a piece of scrap to guide the saw along its line of cut. This procedure often results in uneven, inaccurate and ragged cuts.

Further, where a flat sheet of material such as thin aluminum sheeting is desired to be cut, the inherent flexing properties thereof add to the difficulties of accurate sawing. Thin sheeting has a tendency to flap between the cutting surface and the saw blade, thus adding to the inaccuracy of the cut as well as producing an undesirable clattering noise. The use of a conventional table saw to perform the desired on-the-job sawing of construction materials is most impractical due to the weight and the inconvenience of moving and locating such a tool, especially if the most convenient work location is on scaffolding, requires frequent changing or is of limited area. The use of such table saw is especially impractical to the average homeowner. Such a person often cannot afford nor utilize a bulky and expensive table saw.

One further problem has developed in regard to the particular uses to which a power saw may be put. The user frequently must prepare construction materials having steep-slope angles. Such pieces are needed in constructing gable-type roofs. The limits of the average table saw do not permit such cuts to be readily made, and improvising guide means to do such jobs is even more difficult than in so doing for average cutting. Accordingly, there has developed a need for a guide and support table for use with portable power saws that is lightweight, has the attribute of portability, and can easily be adapted for use in making different slope cuts on construction materials.

It is thus a primary object of this invention to provide a portable saw table for use with a power driven saw to solve the aforesaid problems in an economical and convenient manner.

Another important object of this invention is to provide a portable saw table having adjustable means to facilitate the cutting of any desired angle, particularly one of steep slope, on a work material.

Still another object of this invention is to provide a portable saw table with a flat surface for supporting a work piece, said surface having a cut-out portion extending parallel to the length of the table and guide means for supporting a saw for movement over the cut-out space and permitting the cut of the saw blade to extend below the table surface into said cut-out portion.

The foregoing and other advantages of the invention will become apparent from the ensuing disclosure in which a preferred embodiment of the invention is described in detail and illustrated in the accompanying drawings. It is contemplated that minor variations in structural features and arrangement of parts thereof may occur to the skilled artisan without departing from the scope or sacrificing any of the advantages of the invention.

In the drawings:

FIG. 1 is a plan view of a portable saw table embodying the invention having a power saw operatively carried thereon.

FIG. 2 is a sectional view of the portable saw table illustrated in FIG. 1 with the core filler material removed, and taken along the line 2—2 of FIG. 1 and in the direction indicated.

FIG. 3 is a fragmentary sectional view taken generally along the line 3—3 in FIG. 1 and in the direction indicated.

FIG. 4 is a fragmentary sectional view taken generally along the line 4—4 in FIG. 5 and in the direction indicated, showing the novel stop-gage means of the invention.

FIG. 5 is a fragmentary sectional view taken generally along the line 5—5 in FIG. 4 and in the direction indicated.

FIG. 6 is a sectional view taken generally along the line 6—6 in FIG. 1 and in the direction indicated.

FIG. 7 is a partial plan view of a house having a gable roof, illustrating an angle of cut which can be conveniently made with use of the invention.

Referring now to the drawings, in FIG. 1, the portable table embodying the invention is indicated by the reference character 10. Table 10 is comprised of a planar bed formed by an upper plate 12 and a lower plate 14. Plates 12 and 14 preferably are thin sheets of a lightweight metal, preferably aluminum or other suitable material. Plates 12 and 14 are held spaced apart by side fence members 16 and 18 which extend above upper plate 12 of table 10. As seen best in FIG. 6, fence members 16 and 18 are C-shaped channel pieces, each having a pair of spaced flanges 20 and 22 extending opposite the open ends of said fence members, the fence 18 having a section of its upper portion removed to accommodate the material being worked upon, as illustrated in FIG. 1. Plates 12 and 14 are secured to flanges 20 and 22 respectively by a suitable spot weld or adhesive material. Interposed between plates 12 and 14 is a core filler material 24 of an expanded synthetic plastic, or similar lightweight, cellular substance. Core material 24 adds to the rigidity of table 10.

Interposed between plates 12 and 14 along the longer edges of table 10 are front and rear channel assembly members 26 and 28 respectively. Channel assembly members 26 and 28 secure plates 12 and 14 along the longer edges thereof, and are retained in place by spot welds or other adhesive material. Lower plate 14 has a flange 30 running the length thereof and turned upward toward upper plate 12. Flange 30 abuts front channel member 26.

Upper plate 12 has a channel or recess portion 32 extending the length thereof intermediate the ends of table 10. A channel member 33 is interposed within channel 32 to add rigidity thereto. A hard wood block filler 31 is carried by channel member 33. The upper surface of wood filler 31 extends flush with the upper surface of plate 12 so as to provide a continuous horizontal supporting surface for the underside of the material to be cut. The surface provided by wood block 31 aids in preventing clattering of a work piece to be cut, and also lends to the accuracy of the cut made on said work piece. A cut-out portion or groove 29 extends the length of filler 31 to accommodate a saw blade within channel 32.

Channel 32 defines a space for the reception of the saw blade during cutting. A pair of guide-support rails 34 and 36 are carried by table 10 above and parallel to upper plate 12 adjacent opposite edges of channel 32. Rail 36 is an L-shaped member having a vertical portion 35 and a horizontal portion 37. Rail 34 is of square cross-section to provide added strength thereto. A flange 27 extends horizontally from a vertical wall of said rail. Guide rails 34 and 36 are supported on the upper portions of fences 16 and 18. Slots 38 in fences 16 and 18 permit rails 34 and 36 to be adjusted relative to each other along the shorter axis of the table for accommodating the sole plate 40 of a portable saw 42 as indicated in broken outline in FIG. 2. Flathead screws 44, which do not project above the surfaces of flange 27 and portion 33 of rails 34 and 36 respectively serve to fasten the rails in position, when firmly engaged by nuts 45.

A combination stop and gage member 46 is positioned along one elongate edge 48 of table 10. Gage member 46 is comprised of a slider block 50, stop block 52 and screw means 54 connecting the slider and stop blocks together. Slider block 50 is formed so as to fit within the confines of front channel 26, and be slidable along flange 30 of lower plate 14. Stop block 52 is positioned above upper plate 12. Coaxial with slider block 50. Screw 54 is permanently secured within slider block 50 with a threaded portion 56 extending above said slider block and beyond the upper surface of plate 12. Stop block 52 has an axial bore adapted to receive threaded portion 56 of screw 54. In use, stop block 52 is tightened so as to secure said gauge member at a suitable location along elongate edge 48 of table 10. It will be appreciated that when stop block 52 is tightened, it also is drawn down against upper plate 12 and firmly retained against same while slider block 50 is forced upwardly and is firmly retained against front channel 26.

Gauge member 46 is used in conjunction with score lines 51 which are etched on upper plate 12 of table 10. Said score lines 51 originate from slot 82 in fence 16. As seen in FIG. 1, lines 51 are drawn at varying slopes which are clearly marked. Any number of score lines may be provided on plate 12 so as to indicate any desired slope line needed in use of the saw table 10. There is illustrated in FIG. 1 the more common slope lines which will be in general use, these being the slopes of $9/12$, $5/12$, $4/14$ and $3/12$.

To use the saw 42 on the table 10, the guide rails 34 and 36 are adjusted to receive the sides of the saw sole plate 60 and 62. Rail 36 is adjusted to receive the right hand edge 60 of the plate, with the saw blade 64 located on a line 66 parallel to the elongate axis of table 10. Saw blade 64 is conveniently positioned on line 66 and rail 36 adjusted until it is suitably engaged with the adjacent side 60 of the saw sole plate. The other rail 34 is then adjusted until it is slidably engaged against the left plate edge 62.

The blade 64 extends just below the level of top plate 12 into the cutout portion 29 of wooden block 31 to ensure that work piece 61 is cut completely through. The spacing between guide rails 34 and 36 corresponds to the distance between the opposing edges 60 and 62 of the saw sole plate 40 and may, for example, be between $5\frac{1}{2}''$ and $9\frac{1}{2}''$ depending on the saw model. The saw 42 now rests on the rails 34 and 36 for sliding movement parallel to the longitudinal axis of table 10. Power to the saw, of course, is provided by an electrical cable 80. The saw is now supported on the table for quick accurate cutting without being fixed to the table so that it is easily removable for other uses.

The saw is energized and moved along line 66. An initial cut 82 is made in fence 16 at the point from which score lines 51 originate. Cut 82 serves as a positioning point for the corner 63 of work piece 61. Saw 42 is returned adjacent fence 18 and work piece 61 is inserted beneath rails 34 and 36 from either end of the table, and manually held firmly against upper plate 12. Corner 63 of the work piece is positioned adjacent cut 82. The work piece is then moved so that one edge thereof is aligned with a suitable score line 51, deteremined by the angle of cut desired to be made. Gauge 46 is then loosened and slid so that stop block 52 abuts the edge of work piece 61. Block 52 is then secured in compression engagement with slider block 50. Saw 42 is again energized and moved along line 66, making the desired cut in work piece 61. Wood block 31 supplies support to the underside of work piece 61 so as to prevent flexing and clattering thereof. Rails 34 and 36 serve to guide blade 64 along a straight line so that an accurate, even cut is made. After the cut is made, the saw is retracted and a second piece of work material is easily inserted in its place and cut. Table 10 thus provides a convenient and efficient means of providing steep slope cuts in thin sheet type work materials such as those necessary in constructing gable type roofs as illustrated in FIG. 7.

Where perpendicular cuts are desired to be made on a work piece, table 10 is used with gauge member 46 slid to a convenient out of the way location such as adjacent fence 18. A piece of siding or board is then inserted beneath rails 34 and 36 and aligned parallel to fence 16. Saw 42 is then energized and slid perpendicular across the longitudinal axis of such work piece.

Guide rails 34 and 36 are positioned above plate 12 at a sufficient height to bridge over 2" lumber which has a commonly accepted finish thickness of $1\frac{5}{8}''$. By use of spacers, this bridge height can be increased if desired. Increasing the height of the bridge also permits the saw blade to be raised thereby enabling the work piece to be notched if desired.

It is believed that the invention has been sufficiently described to enable the skilled artisan to understand and practice the same. The invention has been distinctly pointed out in the appended claims intended to be broadly and liberally construed.

What it is desired to be secured by Letters Patent of the United States is:

1. A portable saw table for positioning and guiding construction material to be cut upon said table, said table having a substantially rectangular planar bed for supporting the construction material, guide means for guiding a portable saw positioned above the bed, said bed including a pair of plates in spaced apart relationship, one above the other, at least one of said plates having a depending flange on one of the elongate edges thereof, said stop-gauge structure comprising a slider block positioned between said plates and riding along said flange, a stop block extending above the surface of the uppermost plate and means interposed between said slider block and said stop block so that said stop block and slider block may be drawn together to engage the uppermost plate therebetween and fix the relative position of said stop block with respect to said uppermost plate such that said construction material may be positioned against said stop block at a predetermined angle with respect to the relative path of travel of said saw with respect to said table.

2. A saw table as claimed in claim 1 in which said means interposed between said slider block and stop block is a screw member and said stop block is twisted in tightening fashion for drawing said stop block and slider block together.

3. A saw table as claimed in claim 1 wherein said slider block is provided with a slot which receives said depending flange to slidably engage said slider block and prevent the turning of said slider block relative to said flange during the tightening operation.

4. A saw table as claimed in claim 3 in which said flange is positioned on the lowermost plate and depends with a free edge facing the uppermost plate, said slot opening towards said lowermost plate to receive said flange.

5. In combination with a portable table having a planar surface for supporting construction material to be cut upon said table by a movable saw, said table having a substantially rectangular planar bed for supporting the construction material, guide means for guiding a portable saw positioned above the bed, said bed including a pair of plates in spaced apart relationship, one above the other, at least one of said plates having a depending flange on one of the elongate edges thereof, a stop gauge comprising a slider block positioned between said plates and riding along said flange, a stop block extending above the surface of the uppermost plate and screw means interposed between said slider block and said stop block so that said stop block may be twisted in tightening fashion to draw said slider block and stop block together to engage said uppermost plate therebetween and fix the relative position of said stop block with respect to said uppermost plate.

References Cited
UNITED STATES PATENTS 1,393,126   10/1921   Hinds _____ 143—90
3,168,126   2/1965   Konopka.

DONALD R. SCHRAN, *Primary Examiner.*

U.S. Cl. X.R.
143—47, 132

PO-1050
(5/69)

UNITED STATES PATENT OFFICE
CERTIFICATE OF CORRECTION

Patent No. 3,450,177          Dated June 17, 1969

Inventor(s) Burton L Siegal and George A. Carlberg

It is certified that error appears in the above-identified patent and that said Letters Patent are hereby corrected as shown below:

Column 1, line 18, "As top" should read --A stop--.
Column 3, line 43, "plate 12. Coaxial" should read --plate 12, coaxial--.
Column 4, line 68, "said stop-gauge" should read --a stop-gauge--.

SIGNED AND
SEALED

SEP 30 1969

(SEAL)
Attest:

Edward M. Fletcher, Jr.
Attesting Officer

WILLIAM E. SCHUYLER, JR.
Commissioner of Patents